(12) United States Patent
Akgun

(10) Patent No.: US 10,794,666 B2
(45) Date of Patent: Oct. 6, 2020

(54) MINE SWEEPING VEHICLE

(71) Applicant: YEDITEPE UNIVERSITESI, Istanbul (TR)

(72) Inventor: Mehmet Alaeddin Akgun, Istanbul (TR)

(73) Assignee: YEDITEPE UNIVERSITESI, Isatanbul (TR)

( * ) Notice: Subject to any disclaimer, the term of this patent is extended or adjusted under 35 U.S.C. 154(b) by 0 days.

(21) Appl. No.: 16/341,354

(22) PCT Filed: Oct. 11, 2017

(86) PCT No.: PCT/TR2017/050491
§ 371 (c)(1),
(2) Date: Apr. 11, 2019

(87) PCT Pub. No.: WO2019/032060
PCT Pub. Date: Feb. 14, 2019

(65) Prior Publication Data
US 2019/0242678 A1 Aug. 8, 2019

(30) Foreign Application Priority Data
Oct. 12, 2016 (TR) .............................. a 2016 14314

(51) Int. Cl.
F41H 11/136 (2011.01)
B60V 1/14 (2006.01)
B60V 1/04 (2006.01)
G01S 19/13 (2010.01)
G05D 1/00 (2006.01)
G05D 1/02 (2020.01)

(52) U.S. Cl.
CPC .............. F41H 11/136 (2013.01); B60V 1/04 (2013.01); B60V 1/14 (2013.01); G01S 19/13 (2013.01); G05D 1/0011 (2013.01); G05D 1/0278 (2013.01)

(58) Field of Classification Search
CPC ........... F41H 11/136; B60V 1/04; B60V 1/14; G01S 19/13; G05D 1/0011; G05D 1/0278
USPC ............................................... 102/402; 86/50
See application file for complete search history.

(56) References Cited

U.S. PATENT DOCUMENTS 5,307,272 A * 4/1994 Butler ..................... F41H 11/12
102/402
6,445,334 B1 * 9/2002 Bradley .................... G01S 7/20
342/195

(Continued)

FOREIGN PATENT DOCUMENTS

DE 102015000871 A1 8/2016
EP 1119481 A1 8/2001

(Continued)

Primary Examiner — Samir Abdosh
(74) Attorney, Agent, or Firm — Bayramoglu Law Offices LLC

(57) ABSTRACT

A mine sweeping vehicle includes an arm mechanism and a detector integrated to the arm mechanism. The detector scans the underground by an orbital movement. The mine sweeping vehicle includes at least one data recording element for delivering position information of a mine, the position information of the mine is detected by a detector and provided by a positioning system, and the position information of the mine is delivered to a display element.

14 Claims, 3 Drawing Sheets

(56) References Cited

U.S. PATENT DOCUMENTS

| | | | | |
|---|---|---|---|---|
| 7,683,821 | B1* | 3/2010 | Clodfelter | F41H 11/12 342/22 |
| 9,739,574 | B1* | 8/2017 | Vijay | F41H 11/18 |
| 2002/0122000 | A1* | 9/2002 | Bradley | G01S 7/20 342/22 |
| 2006/0144994 | A1* | 7/2006 | Spirov | B60V 1/06 244/62 |
| 2007/0260378 | A1 | 11/2007 | Clodfelter | |
| 2010/0000817 | A1* | 1/2010 | Clapp | B60V 1/18 180/117 |

FOREIGN PATENT DOCUMENTS

| | | | | |
|---|---|---|---|---|
| GB | 2170158 | * | 1/1985 | F41H 11/16 |
| GB | 2170158 | A | 7/1986 | |
| JP | H063094 | A | 1/1994 | |
| JP | 2015121376 | A | 7/2015 | |
| KR | 20150069190 | A | 6/2015 | |
| WO | 2007079345 | A2 | 7/2007 | |

\* cited by examiner

MINE SWEEPING VEHICLE

CROSS REFERENCE TO THE RELATED APPLICATIONS

This application is the national phase entry of International Application No. PCT/TR2017/050491, filed on Oct. 11, 2017, which is based upon and claims priority to Turkish Patent Application No. 2016/14314, filed on Oct. 12, 2016, the entire contents of which are incorporated herein by reference.

TECHNICAL FIELD

The present invention relates to air-cushion mine sweeping vehicles which are used for detecting positions of the underground mines particularly in defense industry.

BACKGROUND

In the state of the art, there are detectors which are carried manually by people and which perform mine sweeping by right and left oscillation of the hand while walking. However in this technique, a person should be moving very slowly in order to be able to stop when a mine is detected and this might not be possible in every situation. In addition, carrying such a detector for a certain period of time is very tiring for people.

The other current techniques are the mine sweeping technique by armored wheeled vehicles, which are used by a person and resemble construction vehicles, and mine sweeping technique by armored or unarmored wheeled vehicles which can be remotely controlled. Use of these techniques in small and narrow spaces and at places where the vehicle is required to move fast is not suitable.

The patent application numbered GB2170158A relates to mine sweeping vehicles. The application discloses a hovercraft having arms which support a rotatable flail at a safe distance in front of the hovercraft. Tilting of the hovercraft is prevented by the provision of a self-contained skirt within the main skirt of the hovercraft, the self-contained skirt being provided with air pressure from a fan at a pressure higher than the normal operating pressure of the hovercraft. As an additional feature, wheels are provided on the underneath of the hovercraft and are retractable so that they can releasably engage the surface of the ground and enable the hovercraft to be positioned precisely.

Another patent application numbered KR20150069190 discloses an air cushion vehicle for detecting and removing a mine. A propulsion unit is provided in the upper side of surface of the sea, and a mine detection unit and a control unit and a mine removal unit are installed. The said application reduces pressure reaction sensitivity of the mine since the air cushion land craft does not come in contact with the surface of the sea while the air cushion land craft moves so as to safely detect and remove the mine. Moreover, the mine sweeping work of the said application requires less cost than the mine sweeping work of a helicopter, and the air cushion land craft for detecting and removing a mine is capable of navigating in land and sea so as to rapidly navigate to a destination when an urgent situation occurs to perform the mine sweeping work.

SUMMARY

The objective of the present invention is to provide an unmanned air-cushion mine sweeping vehicle by which underground mines are detected in an unmanned manner and the position information is recorded.

Another objective of the present invention is to visibly mark the detected positions of the mines on the ground.

In order to fulfill the said objective, the present invention comprises a mine sweeping vehicle having an arm mechanism and a detector, which is integrated to the arm mechanism and which scans the underground by an orbital movement. The mine sweeping vehicle comprises at least one data recording element that delivers the position information of the mines, which are detected by the detector, provided by a positioning system to a display element. In a possible embodiment of the invention, the positioning system is a GPS system, the data recording element is a printed circuit board and the display element is a computer. Thus, the position information of the mines provided by the positioning system is recorded and displayed on the display element, which is located at a safe distance from the mine sweeping vehicle.

In another possible embodiment of the invention, the mine sweeping vehicle comprises a first fan assembly having at least one fan that enables it to rise from the ground and at least one propeller which enables it to move in a movement direction. Thus, the mine sweeping vehicle rises away from the ground in an ascension direction and moves in a movement direction.

In another possible embodiment of the invention, the propellers are configured to be rotatable so as to enable turning of the vehicle. Hence, the mine sweeping vehicle is enabled to turn right-left.

In another possible embodiment of the invention, the vehicle comprises a second fan assembly having fans that are positioned opposite to each other and provide thrust in a the plane of the vehicle and enable turning of the vehicle. Thus, the mine sweeping vehicle is enabled to turn right-left and a thrust is provided in the opposite direction to prevent lateral slipping thereof in a slanting land.

In another possible embodiment of the invention, there is at least one sensor which provides signal to the second fan assembly. Thus, the sensors which deliver signal for activation of the second fan assembly are provided.

In another possible embodiment of the invention, the arm mechanism comprises a first arm moving away from the mine sweeping vehicle and a second arm connected to the first arm. Thus, a first arm and a second arm are provided which carry the detector at a certain distance from the front part of the mine sweeping vehicle.

In another possible embodiment of the invention, there is provided a marker which is connected to the first arm and which places a mark on the ground to show the position of the mine according to a signal received from the data recording element. This way, the detected positions of the mines on the ground are visibly marked.

In a further possible embodiment, the said marker is a paint cylinder. Thus, the position of the mine is marked on the ground via paint.

In another possible embodiment of the invention, the vehicle is a remotely controlled unmanned mine sweeping vehicle. Thus, a mine sweeping vehicle which can be remotely controlled safely is provided.

In another possible embodiment of the invention, the vehicle is a programmable autonomous mine sweeping vehicle. This way, a mine sweeping vehicle, which detects mines by scanning in a single direction on a land or narrow road, is provided.

In an alternative embodiment of the invention, the body of the mine sweeping vehicle can be provided in different geometric shapes.

In another alternative embodiment of the invention, turning of the vehicle can be enabled by the turning of the propellers to right-left or via an aerodynamic surface integrated at the back of the propellers.

In another alternative embodiment of the invention, the second fan assembly can be driven by drive members different from the ones driving the first fan assembly.

REFERENCE NUMBERS

Figure 1:
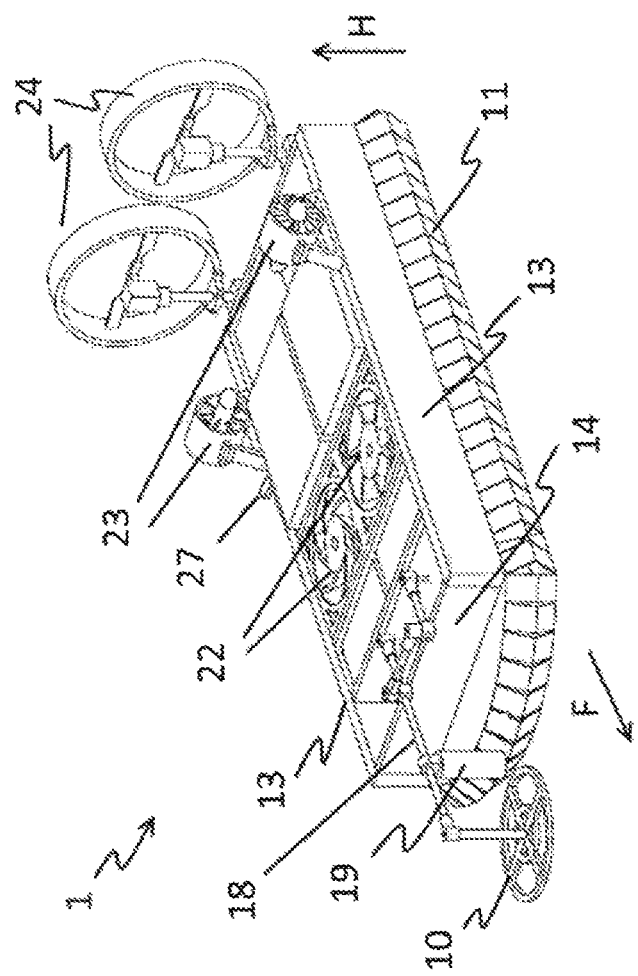
FIG. 1 is a representative view of the mine sweeping vehicle of the present invention.

1. Mine sweeping vehicle
10. Detector
11. Body
12. Inner profile
13. Side walls
14. Front wall
15. Rear wall
16. Intermediate wall
17. Base
18. Arm mechanism
181. First arm
182. Second arm
183. Threaded shaft
19. Marker
191. Channel
21. Data recording element
22. First fan assembly
23. Second fan assembly
231. Connection Profile
24. Propellers
241. Supporting arm
25. Drive member
26. Display element
27. Sensor
28. Fan assembly sheet
29. Front electronic control unit
30. Rear electronic control unit
31. Satellite
32. Base station
33. Communication box
F. Movement direction
H. Ascension direction

DETAILED DESCRIPTION OF THE EMBODIMENTS

Figure 2:
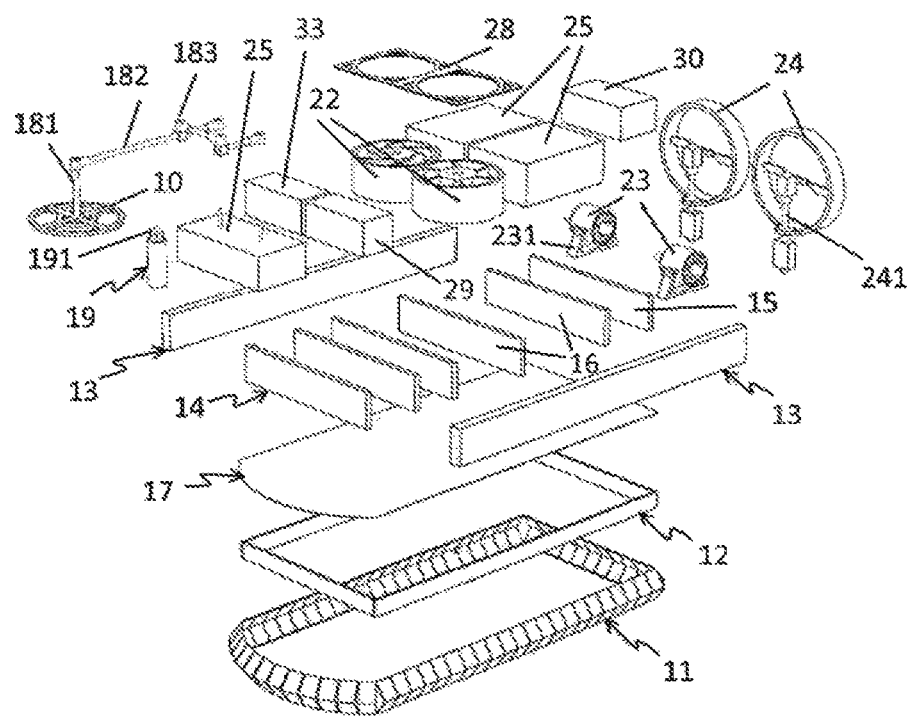
FIG. 2 is an exploded view of the mine sweeping vehicle of the present invention.

Referring to FIG. 1 and FIG. 2, the mine sweeping vehicle (1) of the present invention has a body (11) that contacts the ground when not performing mine sweeping. There is provided an inner profile (12) which fits into the hollow inside the body (11) such that it supports the body (11). In a possible embodiment, the inner profile (112) is rectangular. A base (17) having a form that is suitable to the shape of the body (11) is disposed on the body (11). Here, the body (11) and the inner profile (12) are provided on a lower part of the base (17). On an upper part of the base (17), there are a front wall (14) and a rear wall (15) lying parallel to each other. There are side walls (13) lying parallel to each other between the front wall (14) and the rear wall (15). A rectangular frame is obtained by connecting the front wall (14), the rear wall (15) and the side walls (13). The said side walls (13) are connected to each other via at least one intermediate wall (16) thereby forming partitions of certain sizes. A detector (10) is provided on the front part of the mine sweeping vehicle (1). The detector (10) is supported by an arm mechanism (18) and is integratedly connected to the arm mechanism (18). In a possible embodiment, the detector (10) is circular. The arm mechanism (18) has a first arm (181) and a second arm (182). The second arm (182) extends such that it moves away from the front part of the vehicle. The first arm (181) connected to the second arm (182) from one end thereof extends such that it moves the detector (10) towards the ground. The arm mechanism (18) performs a repeated orbital movement via the drive provided by a drive member (25) by means of at least one threaded shaft (183). In a possible embodiment, the drive member is a four-bar linkage mechanism and the said orbital movement is a right-left oscillation of the arm mechanism (18) along an arc-like orbit. Additionally, a marker (19) is positioned on the arm mechanism (18). This positioning is provided by having the first arm (181) firmly pass through a channel (91) provided on the marker (19). In a possible embodiment, the said marker (19) is a paint cylinder.

The mine sweeping vehicle (1) comprises a first fan assembly (22) having at least one fan such that it enables the vehicle to rise from the ground in an ascension direction (H). Each fan in the first fan assembly (22) is positioned so as to be accessed through the openings provided in a fan assembly sheet (28). There is provided at least one propeller (24) connected to the rear wall (15) at a rear part of the mine sweeping vehicle (1) such that it enables the mine sweeping vehicle (1) to move in a movement direction (F). The propellers (24) are connected to the rear wall (15) via a rotary shaft that enables to direct the vehicle by turning a supporting arm (241) or the propellers. In a possible embodiment, the blades of the propellers (24) which rotate so as to provide air stream are positioned in a circular ring. There is provided a second fan assembly (23) which is located on the side walls between the front part and the rear part of the mine sweeping vehicle (1) and which has at least one fan. Each fan in the second fan assembly (23) is connected to the side wall (13) by means of a connection profile (231). The first fan assembly (22) and the second fan assembly (23) are driven by at least one drive member (25). In a possible embodiment, there are two drive members (25) which drive the first fan assembly (22) and the second fan assembly (23) independently. There is at least one sensor (27) provided in the mine sweeping vehicle (1) to provide signals to the second fan assembly (23). In a possible embodiment, the said sensor (27) is a slip sensor which detects slippage of the vehicle or its deviation from the detection orbit. At the turns of the vehicle or in slanting land, the signals received from the sensor (27) are delivered to a control circuit and the second fan assembly (23) is activated with the drive supplied by the drive members (25) via the control circuit. As the second fan assembly (23) provides a lateral thrust in the opposite direction to the slippage, the mine sweeping vehicle (1) is enabled to perform its turn or get back to its route. There is a front electronic control unit (29) in the mine sweeping vehicle (1) to control the arm mechanism (18) and the marker (19). In addition, there is a rear electronic control unit (30) which controls the drive members (25) and the second fan assembly (23).

Figure 3:
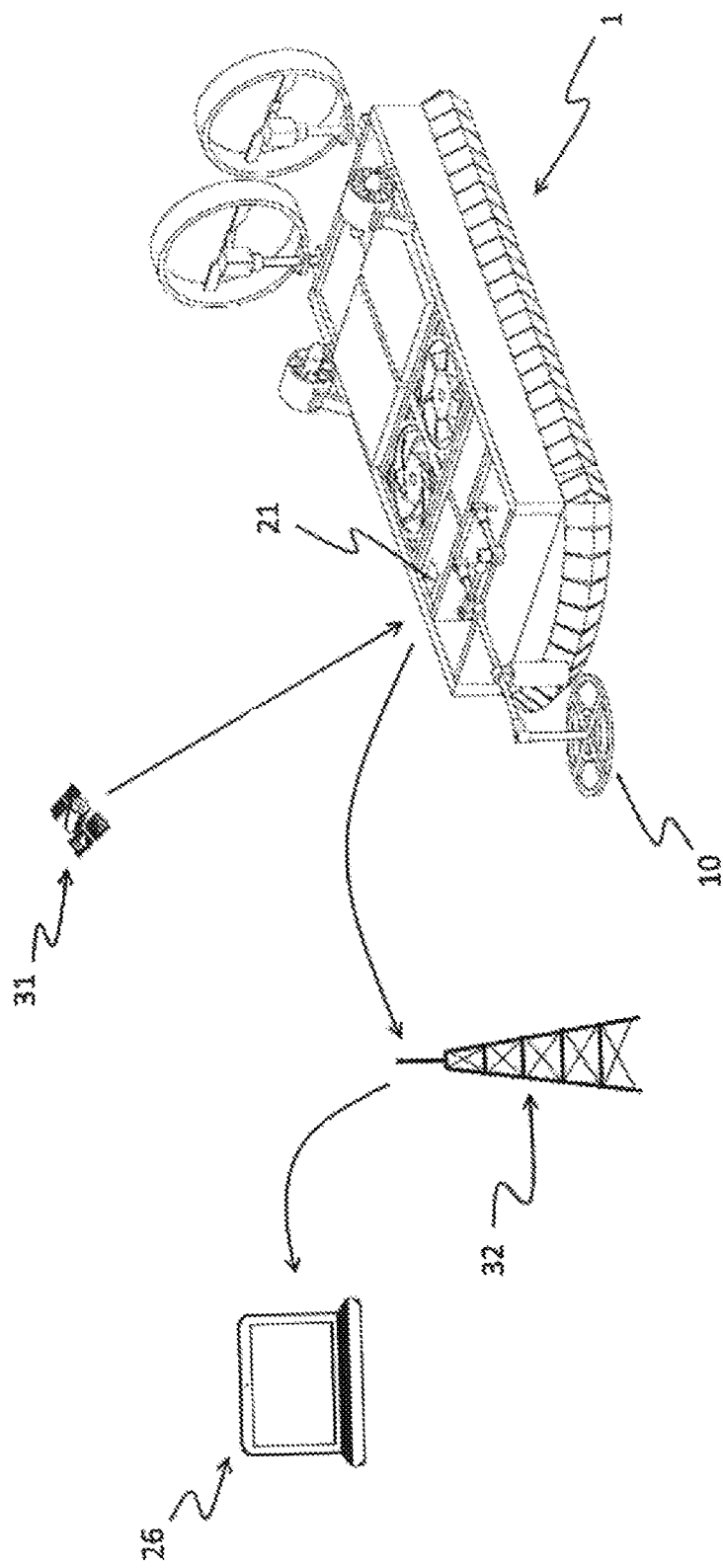
FIG. 3 is a schematic view showing the communication system of the mine sweeping vehicle of the present invention.

Referring to FIG. 3, the position information received from a satellite (31) in the orbit of the earth is transmitted to a communication box (33) provided in the vehicle. A data recording element (21) is provided in the communication box (33). In a possible embodiment, the said data recording element (21) is a printed circuit board. The position information of a mine detected underground by the detector (10) is provided by a positioning system from the satellite (31). In a possible embodiment, the said positioning system is a GPS system. The position information received from the positioning system is delivered to a base station (32) and the data transferred from the base station (32) to the servers is transmitted to a display element (26). By this means, the position information of the mine detected by the detector (10) is marked on a map on the display element (26). In a possible embodiment, the said display element (26) is a computer. In another possible embodiment, the said display element (26) is a smart cell phone or a hand-held tablet device. Furthermore, by means of a signal delivered to the marker (19) from the data recording element (21), the marker (19) visibly marks the position of the mine on the ground. In the case that the marker (19) is a paint cylinder, paint is enabled to be sprayed to the ground.

The mine sweeping vehicle (1) of the present invention is a remotely-controlled unmanned mine sweeping vehicle or a programmable autonomous mine sweeping vehicle.

What is claimed is:

1. A mine sweeping vehicle, comprising:
an arm mechanism;
a detector integrated to the arm mechanism and configured to scan an underground by an orbital movement;
at least one data recording element; wherein position information of a mine is provided by a positioning system, and detected by the detector, and the position information of the mine is delivered to a display element by the at least one data recording element;
a first fan assembly and at least one propeller, wherein the first fan assembly having at least one fan is configured to make the mine sweeping vehicle rise from a ground, and at least one propeller is configured to make the mine sweeping vehicle move in a movement direction; and
a second fan assembly having a plurality of fans, wherein the plurality of fans are positioned opposite to each other; and the second fan assembly is configured for a turning of the mine sweeping vehicle and preventing the mine sweeping vehicle from slipping sideways.

2. The mine sweeping vehicle according to claim 1, wherein the positioning system is a GPS system, the at least one data recording element is a printed circuit board, and the display element is a computer, a smart cell phone or a tablet device.

3. The mine sweeping vehicle according to claim 1, wherein the at least one propellers is configured to be rotatable for a turning of the mine sweeping vehicle.

4. The mine sweeping vehicle according to claim 1, wherein the mine sweeping vehicle comprises at least one sensor, that and the at least one sensor provides a signal to the second fan assembly.

5. The mine sweeping vehicle according to claim 1, wherein the arm mechanism comprises a first arm moving away from the mine sweeping vehicle and a second arm connected to the first arm.

6. The mine sweeping vehicle according to claim 5, wherein the mine sweeping vehicle comprises a marker, the marker is connected to the first arm and configured to place a mark on a ground to show the a position of the mine according to a signal received from the at least one data recording element.

7. The mine sweeping vehicle according to claim 6, wherein the marker is a paint cylinder.

8. The mine sweeping vehicle according to claim 1, wherein the mine sweeping vehicle is a remotely controlled unmanned mine sweeping vehicle.

9. The mine sweeping vehicle according to claim 1, wherein the mine sweeping vehicle is a programmable autonomous mine sweeping vehicle.

10. The mine sweeping vehicle according to claim 2, wherein the at least one propeller is configured to be rotatable for a turning of the mine sweeping vehicle.

11. The mine sweeping vehicle according to claim 2, wherein the mine sweeping vehicle comprises at least one sensor, and the at least one sensor provides a signal to the second fan assembly.

12. The mine sweeping vehicle according to claim 2, wherein the mine sweeping vehicle is a remotely controlled unmanned mine sweeping vehicle.

13. The mine sweeping vehicle according to claim 11, wherein the mine sweeping vehicle is a remotely controlled unmanned mine sweeping vehicle.

14. The mine sweeping vehicle according to claim 4, wherein the mine sweeping vehicle is a remotely controlled unmanned mine sweeping vehicle.

* * * * *